(12) United States Patent
Schrader

(10) Patent No.: US 8,264,104 B2
(45) Date of Patent: Sep. 11, 2012

(54) MOTOR FOR OPTICAL SYSTEMS

(75) Inventor: Stephan Schrader, Berlin (DE)

(73) Assignee: Karl Storz GmbH & Co. KG, Tuttlingen (DE)

( * ) Notice: Subject to any disclaimer, the term of this patent is extended or adjusted under 35 U.S.C. 154(b) by 263 days.

(21) Appl. No.: 12/576,379

(22) Filed: Oct. 9, 2009

(65) Prior Publication Data

US 2010/0127580 A1 May 27, 2010

(30) Foreign Application Priority Data

Oct. 9, 2008 (DE) .................. 10 2008 042 701

(51) Int. Cl.
*H02K 41/00* (2006.01)
*G02B 7/02* (2006.01)

(52) U.S. Cl. ............... 310/12.04; 310/12.01; 310/12.21; 310/12.24; 359/696; 359/824

(58) Field of Classification Search ............... 310/12.01, 310/12.04, 12.12, 12.24, 15, 23; 359/687, 359/696, 823, 824, 694, 819
See application file for complete search history.

(56) References Cited

U.S. PATENT DOCUMENTS

| | | | | |
|---|---|---|---|---|
| 3,814,376 A | * | 6/1974 | Reinicke | 251/65 |
| 4,751,487 A | * | 6/1988 | Green, Jr. | 335/234 |
| 4,785,210 A | * | 11/1988 | Maruyama et al. | 310/12.04 |
| 5,330,967 A | * | 7/1994 | Takahata et al. | 505/166 |
| 5,365,210 A | * | 11/1994 | Hines | 335/238 |
| 5,478,650 A | | 12/1995 | Davanloo et al. | |
| 5,478,658 A | | 12/1995 | Dodabalapur et al. | |
| 6,246,131 B1 | | 6/2001 | Sheng | |
| 6,265,956 B1 | * | 7/2001 | Cascolan et al. | 335/234 |
| 7,365,768 B1 | | 4/2008 | Ono et al. | |
| 7,476,990 B2 | * | 1/2009 | Nakagawa et al. | 310/15 |
| 2008/0000347 A1 | * | 1/2008 | Minowa et al. | 92/88 |

FOREIGN PATENT DOCUMENTS

| | | |
|---|---|---|
| DE | 196 18 355 | 11/1997 |
| DE | 19900788 | 7/2000 |
| DE | 10323629 | 10/2004 |
| EP | 0568028 | 11/1993 |
| JP | 57-76805 | 5/1982 |

OTHER PUBLICATIONS

EP Search Report for EP Application 09172539.0.

* cited by examiner

*Primary Examiner* — Tran Nguyen
(74) *Attorney, Agent, or Firm* — Meyertons, Hood, Kivlin, Kowert & Goetzel, P.C.; Eric B. Meyertons

(57) ABSTRACT

A motor for optical systems, for example endoscopes, has a stator with two permanent magnets having poles which are disposed in the same direction and are magnetically interconnected by a flux return element. A coil is disposed between the magnets. Laterally of each magnet, a pole shoe is also magnetically coupled with the flux return element. A slider of the motor includes a yoke of a soft magnetic material, which yoke is in magnetic engagement with the permanent magnets of the stator. When the coil is excited with a current, the slider can be displaced from its rest position along a longitudinal direction.

9 Claims, 6 Drawing Sheets

MOTOR FOR OPTICAL SYSTEMS

PRIORITY CLAIM

This application claims priority to pending German Application No. DE 102008042701.2 filed on Oct. 9, 2008.

BACKGROUND OF THE INVENTION

1. Field of the Invention

The invention relates to a motor for optical systems, in particular for lens systems in endoscopes. With modern video endoscopes a camera chip and also an associated lens system are incorporated in the endoscope tip. A miniaturized motor is needed for adjustment of the focal length or the focus of the lens system.

2. Description of the Relevant Art

Classical endoscopes, as can be used for example for minimal invasive surgery, convey an image by means of rod lenses from an intra-corporal objective lens to an extra-corporal eyepiece. Owing to the rod lenses, the system the system is rigid and of limited optical quality. Modern video endoscopes use a camera chip in the endoscope tip. An endoscope of this kind is disclosed in U.S. Pat. No. 7,365,768 B1. This has a rigidly disposed lens in front of the camera chip. An adjustment of the focal length of the lens is not possible.

DE 196 18 355 C2 shows a drive adapted to be incorporated in endoscopes for adjusting the focal length of a lens system. For this, a permanent magnet is moved as a slider within a stator coil. However, owing to the large mass of the permanent magnet, the drive is slow. A relationship between the coil current and the slider position is not unequivocal and additionally necessitates a path sensor with position control.

DE 37 17 872 C2 discloses a drive with a slider and a stator for a lens system in video cameras. The slider consists of two iron sleeves which are coupled to each other by a support for accommodating the lens system. The stator has two coils and also a single annular magnet for generating the magnetic fields necessary for the movement. The complex construction of the drive can be well implemented with video cameras having lens diameters in a range of centimeters, but cannot be scaled to a size in a range of millimeters, which would be needed for endoscopic applications.

DE 199 00 788 A1 discloses a motor for a valve having a permanent magnet, a coil and a solid plunger for actuating the valve.

JP 57-076805 A discloses a motor having a permanent magnet, a coil and a solid plunger. The magnetic flux runs between an end plate of the coil and the plunger through a position dependent air gap. This results in a strong nonlinearity of the force and the displacement.

SUMMARY OF THE INVENTION

It is desirable to provide a motor of such small dimensions that it can be used for optical systems in endoscopes.

It is further desirable to provide a motor having a defined zero position and also a reproducible excursion depending upon a control signal.

It is further desirable to provide a motor which makes possible a rapid, continuous, and exact positioning of an optical system within as large as possible a range. With this, a path of rays through the optical system should not be blocked during a displacement of the components.

It is further desirable to provide a motor having a small power loss, so that little heat is evolved in a tip of an endoscope.

It is further desirable to provide a motor having a drive assembled from as few as possible, geometrically simple, single constructional components, so as to enables easy fabrication and assembly, The above deficiencies in the prior art are remedied with a motor for optical systems, which includes:

a stator with a first permanent magnet and a second permanent magnet, the permanent magnets having poles disposed in a same direction;

a flux return element magnetically interconnecting the first permanent magnet and the second permanent magnet;

a coil disposed between the first permanent magnet and the second permanent magnet; and a slider which is displaceable parallel to the stator;

with the slider having at least one yoke disposed on a side of the stator facing away from the flux return element, which yoke is in magnetic engagement with the first permanent magnet and the second permanent magnet.

In an embodiment, the motor is a linear motor.

BRIEF DESCRIPTION OF THE DRAWINGS

In the following, the invention will be described by way of example, without limitation of the general inventive concept, on examples of embodiment and with reference to the drawings.

Figure 1:
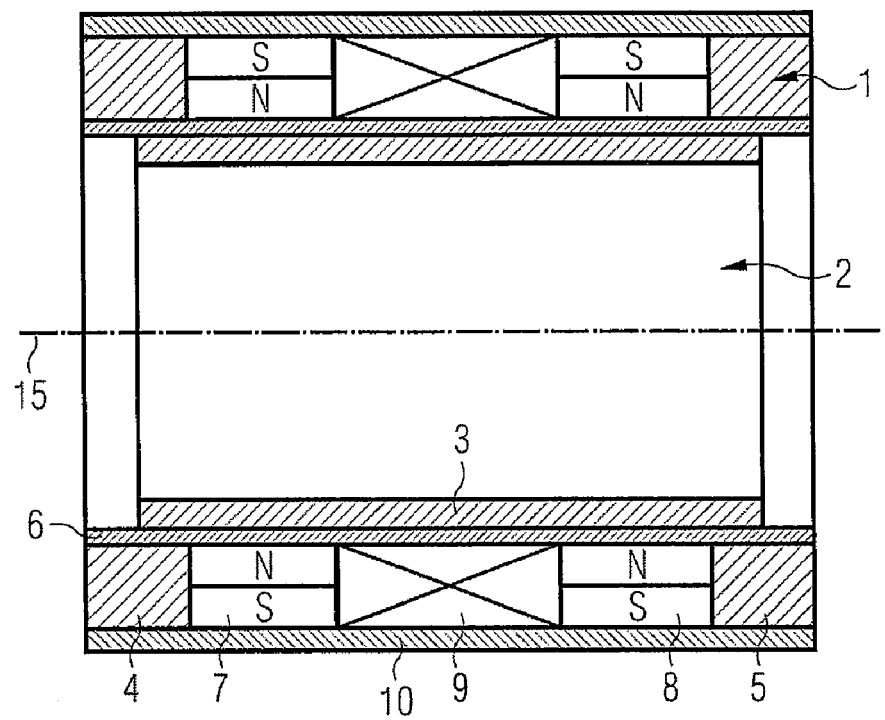
FIG. 1 schematically shows a motor with radial permanent magnets.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The motor for optical systems includes a stator, and also a slider that is linearly displaceable with respect thereto. In an embodiment, the motor is a linear motor. The stator has a first permanent magnet 7 and also a second, equally polarized permanent magnet 8, which magnets are magnetically interconnected by a magnetic flux return element 10. A coil 9 is disposed between the two permanent magnets. The flux return element 10 is disposed to be at least substantially parallel to a direction of movement. Furthermore, the motor has a slider with a yoke 3 which is at the same time in magnetic engagement with the first permanent magnet 7 and the second permanent magnet 8, i.e. conducts the magnetic fields of the two permanent magnets. Preferably the yoke 3 is disposed on the side of the stator facing away from the flux return element 10, and at least substantially parallel to the movement direction.

Preferably the motor is of rotational symmetry, for example of hollow-cylinder shape. In this case the pole shoes 4, 5, the magnets 7, 8, and also the coil 9 can be ring-shaped or annular. The slider and in particular its yoke then preferably have the shape of a cylindrical sleeve. The ray path of the optical system can then pass through the sleeve, i.e. the yoke. In particular, a lens can be seated inside the sleeve. With this, the focal length of the optical system can be set by shifting the sleeve.

As the magnetic field of the coil passes through the flux return element 10 and through the yoke 3, the flux return element 10 and the yoke 3 themselves should have no air-gap.

Between two end positions the motor makes possible an exact setting of the position of the slider or the yoke 3 relative to the stator. With the motor an unequivocal position of the slider relative to the stator corresponds to each value of coil current. Thus, the slider can be continuously displaced along the range of travel by setting the coil current. Because of this unequivocal assignment of the coil current to the slider position, it is possible to dispense with a path measurement which would be necessary in prior art for a determination of the position of the slider. The here described motor has no permanent magnets in the slider which in a simplest case consists of only the yoke. For this reason the slider has a very small mass and can be moved very rapidly between two positions. The motor can be constructed to have a free center passage, for example to be rotationally symmetrical. The path of rays of the optical system can pass through the center passage, and any optical components there installed, such as for example lenses, can be linearly displaced. The individual constructional components are of simple configuration (rings, sleeves) and therefore can be manufactured and assembled simply.

The motor can be miniaturized without problems down to an outer diameter size of a few millimeters. With a motor having an outer diameter of a few millimeters the range of movement between the two end positions of the slider is typically about 1 to 3 mm.

The coil 9 can be wound optionally on a coil former, or also without a coil former.

For improved control of the magnetic flux it is of advantage for a first pole shoe 4 and a second pole shoe 5 to be disposed on respective sides of the coil 9, and to be coupled to the flux return element 10. The yoke and the pole shoes must always include ferromagnetic and/or soft magnetic materials.

A detailed illustration of the operation of the motor can be found in the description of the Figures.

It is of particular advantage for the permanent magnets 7, 8 to be disposed between the pole shoes 4, 5. It is especially favorable for the length of the yoke 3 to be shorter than or equal to the distance between the centers of the pole shoes 4, 5.

In another advantageous embodiment, the permanent magnets 7, 8 are disposed outside the pole shoes 4, 5.

It is of especial advantage for the permanent magnets 7, 8 to be oriented radially. With this, the flux return element 10 includes a ferromagnetic and/or a soft magnetic material.

In another embodiment the permanent magnets 7, 8 are oriented axially, i.e. to be parallel to the center axis 15. With this, the permanent magnets take over the function of the flux return element 10. For mechanical stabilization an outer tube 16 of non-ferromagnetic or soft magnetic material can be provided instead of the flux return element 10.

In another advantageous embodiment a slide layer 6 is located between the stator and the slider. This can be designed to be a slide sleeve or bush, particularly in the case of an arrangement of rotational symmetry. In order to affect the magnetic fields as little as possible, the slide layer should consist of a material which does not guide magnetic fields, in particular a non-ferromagnetic material. Its surface preferably includes a material of a low coefficient of friction, for example PTFE (poly tetrafluoroethylene), or DLC (diamond-like carbon) as disclosed, for example, in U.S. Pat. No. 5,478,658.

The slide layer 6 can compensate unevenness on the side of the stator facing the slider.

Owing to the slide layer, a constant minimal magnetic "air gap" of the magnetic circuit between components of the stator and the slider is ensured. This minimal "air gap" is absolutely necessary for a functioning of the motor, because a yoke that abuts on one of the permanent magnets or a pole shoe would cause a magnetic short circuit.

In another embodiment the yoke 3 of the slider can be designed also to be longer (with reference to its direction of movement) than the stator.

The described motor can be implemented with a plane stator, e.g. built-up of plates, and an also plane yoke of the slider, which yoke may be built-up of plates. Alternatively, a plurality of motors disposed around a cylinder or a multi-cornered body can be provided. Thus, for example, stable guiding results with a uniform arrangement of 3 motors around a cylinder.

FIG. 1 schematically shows an example of an embodiment having a cylindrical constructional shape. The stator includes a flux return element 10 in the form of a soft magnetic flux return tube, in the bore of which two axially spaced soft magnetic pole shoes 4, 5, and also two permanent magnet rings 7, 8 which are radially magnetized in the same direction, and a central coil 9 are disposed. Here a slide sleeve 6 closes-off the inside of the stator 9 and provides a slide layer for the slider. The slide sleeve must be of a non-ferromagnetic material. The slider 2 here includes a yoke 3, into the bore of which an element to be positioned, such as an optical component, can be inserted. The slider can slide axially along both directions within the slide sleeve. With arrangement built to have rotational symmetry, the center axis 15 is also the rotation axis.

Figure 2:
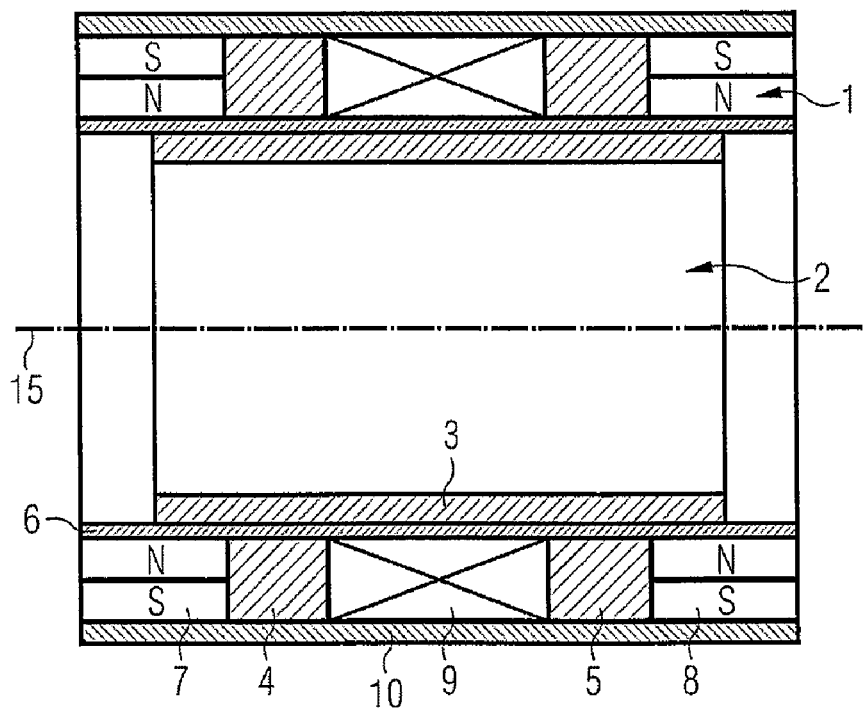
FIG. 2 shows another motor.

FIG. 2 shows another embodiment in which the pole shoes and the permanent magnets have been interchanged. The function is in accordance with this.

Figure 3:
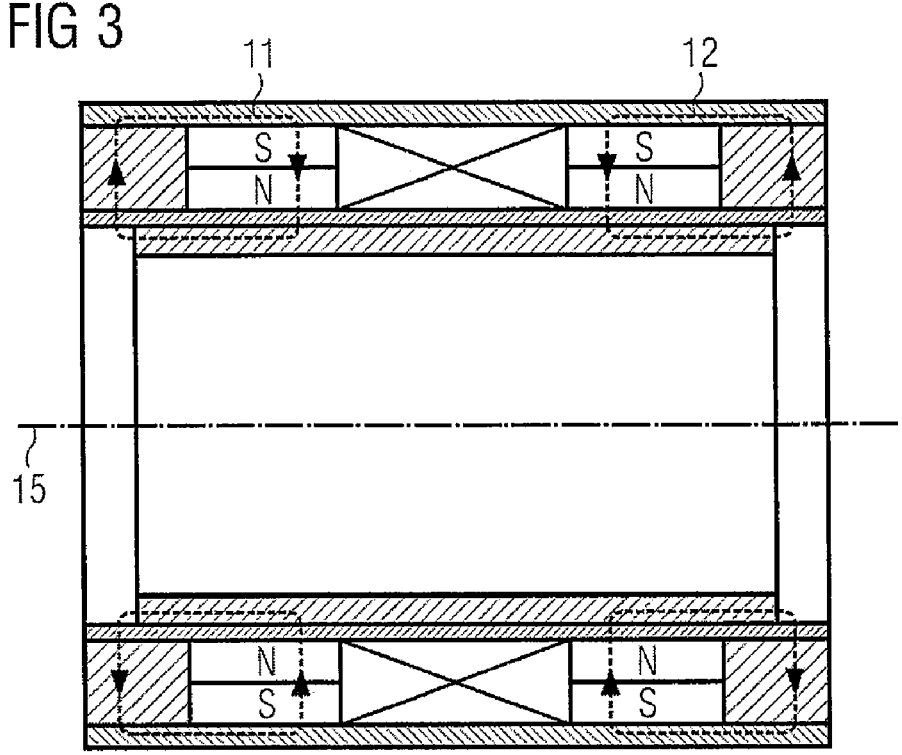
FIG. 3 shows the course of the field in the motor of FIG. 1 with a currentless coil.

FIG. 3 shows an illustration of an embodiment with the magnetic circuits at rest when the coil is without current.

The permanent magnets each generate a magnetic flux 11, 12 which, starting out from the north pole of each single magnet 7, 8, flows through the yoke 3 and in each case radially outwards via the pole shoes 4, 5 of the stator, from where it flows in direction of the stator center via the flux return element 10 to reach the south pole. Here the slider must be shorter than the distance between the centers of the two pole shoes. In this manner, in each case an air-gap occurs between the yoke 3 and the respective pole shoe 4, 5 at the center position of the slider, which air-gap represents a magnetic resistance for the two magnetic circuits. The two magnetic circuits 11, 12 endeavor to minimize the length of their respective air-gaps, in order to thus minimize the respective magnetic resistance of the circuit. With this, so-called reluctance forces arise in both magnetic circuits, which endeavor to draw the respective end of the yoke 3 axially in the direction of the respective pole shoe 4, 5 and to reduce the air-gap and therewith the magnetic resistance. The lowest magnetic resistance of a circuit is attained when the yoke 3 is completely immersed in the corresponding pole shoe 4, 5. In a central position of the yoke, the air gaps and therewith the reluctance forces of the two circuits are of equal magnitude. With suitable dimensioning of the length of the yoke 3 and also of the maximal lengths of the components of the stator, a stable central position of the slider then results.

If as a consequence of externally acting forces, for example acceleration forces, the yoke 3 is urged out of this stable position in one of its two directions of movement, then restoring forces operate to urge the yoke 3 back into the central position. The reluctance forces hold the yoke 3 in this position, acting like a mechanical spring.

Figure 4:
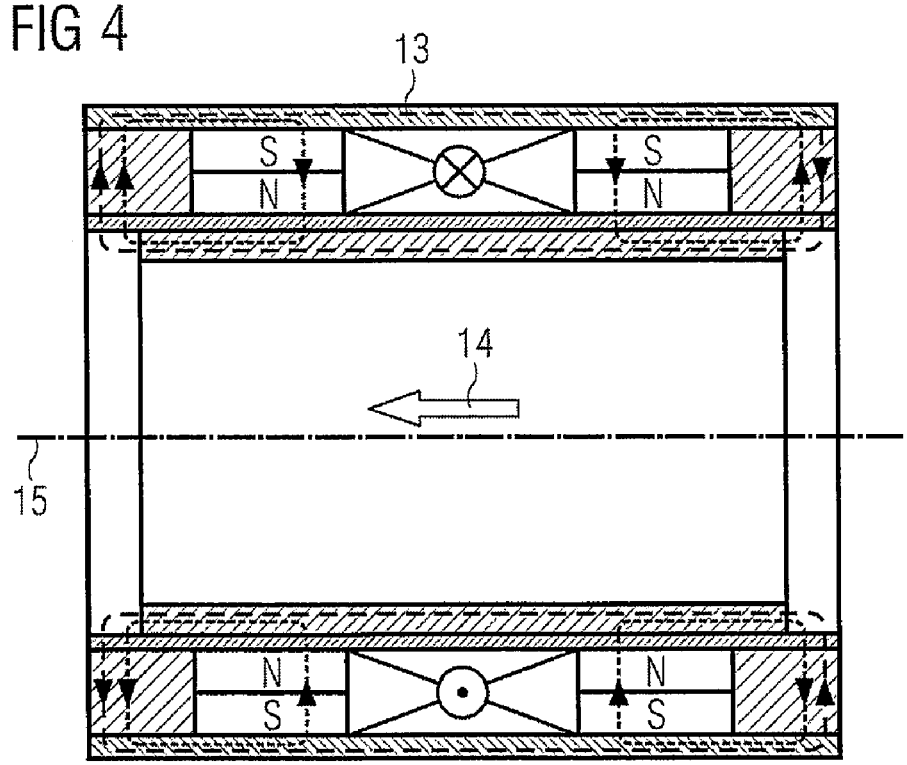
FIG. 4 shows the course of the field of the motor of FIG. 3 with a current-carrying coil.

FIG. 4 now shows the magnetic circuits with a current-carrying coil.

If now the coil 9 is energized with current in the direction marked in the Illustration 4, i.e. supplied with current, then the current will flow into the plane of the illustration in the upper half of the cross-sectional area, and out of it in the lower half. Now in the upper cross-sectional area a magnetic circuit 13 generated by the current will form around the coil 9, which magnetic circuit is oriented in a counter-clockwise direction and endeavors to flow through the soft iron component parts such as the yoke 3, the pole shoes 4, 5, and the flux return element 10. Therefore the magnetic circuit of the coil will close through the yoke 3 of the slider, the two outer pole shoes 4, 5, and the flux return element 10 of the stator. This electrically generated magnetic circuit 13 is now superposed on the two magnetic circuits 11, 12 of the permanent magnets within the soft magnetic building components and thereby acts to strengthen the left-hand circuit and to weaken the right-hand circuit. The greater magnetic flux of the left-hand magnetic circuit generates a greater attractive reluctance force on the yoke 3 than the flux of the right-hand circuit. This results in a displacement of the slider in the direction of the stronger left-hand magnetic circuit. With increasing strength of the current through the coil, the strengthening of the left-hand permanent magnet circuit and the weakening of the right-hand permanent magnet circuit and therewith also the displacement of the yoke 3 or the slider are promoted. Thus there exists an unequivocal correlation between current strength and slider position. A reversal of the current direction causes a displacement of the yoke 3 in an opposite direction. With a symmetrical construction, the movement characteristics in both directions are identical. It is furthermore decisive for the driving properties that the position of the yoke 3 be stable even in a desired position that corresponds to the current strength. The maximum travel in each direction is attained, in accordance with the design of the stator, approximately when the yoke 3 completely covers the pole shoe 4, 5 located along the movement direction, and the air-gap in this magnetic circuit can no longer be reduced.

The radial direction of polarization of the magnets can be also reversed. This causes a reversal of the movement direction for a given current value, by comparison with the previously described construction. For the operability of the motor it is merely decisive that both magnets be radially magnetized in the same direction.

In a manner similar to that of the here illustrated embodiment, the yoke can also project beyond the outer pole shoes of the stator. In this case the two-way reluctance forces of the two magnetic circuits 11 and 12 do not each act axially to pull outwards as previously described, but each acts to push towards the center of the stator.

Nevertheless, the characteristic features of the motor remain unchanged. The yoke 3 continues to have a stable center position in a no-current state, and can be continuously moved in dependence upon the current strength and the current direction.

Figure 5:
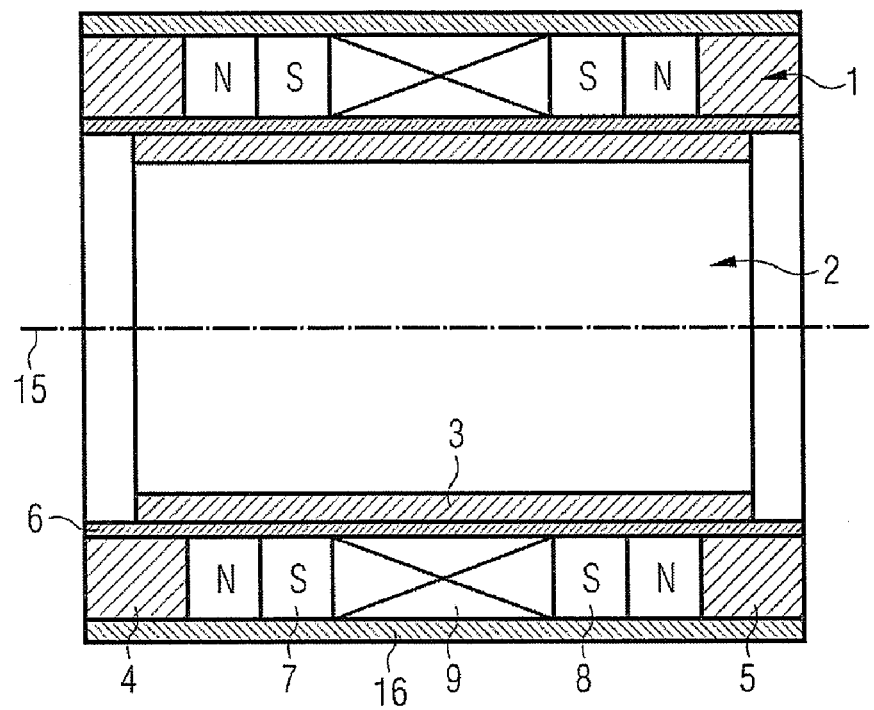
FIG. 5 schematically shows a motor with axial permanent magnets.

FIG. 5 schematically shows a motor similar to that of FIG. 1. However, here the permanent magnets 7, 8 are axially aligned, i.e. parallel to the center axis 15. With this, the permanent magnets take over also the function of the flux return element. Instead of the flux return element 10, here an outer tube 16 is provided which supports the remaining constructional components of the stator of the motor. The outer tube 16 is preferably of a non-ferromagnetic material, in order not to short-circuit the permanent magnets.

Figure 8:
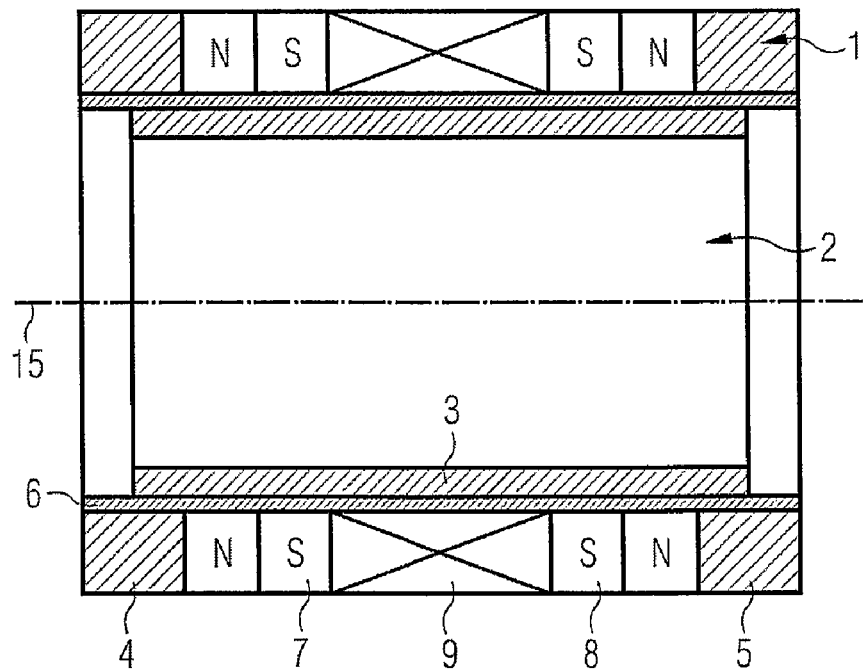
FIG. 8 schematically shows another motor with axial permanent magnets.

FIG. 8 shows the motor of FIG. 5, but without the outer tube 16.

Figure 6:
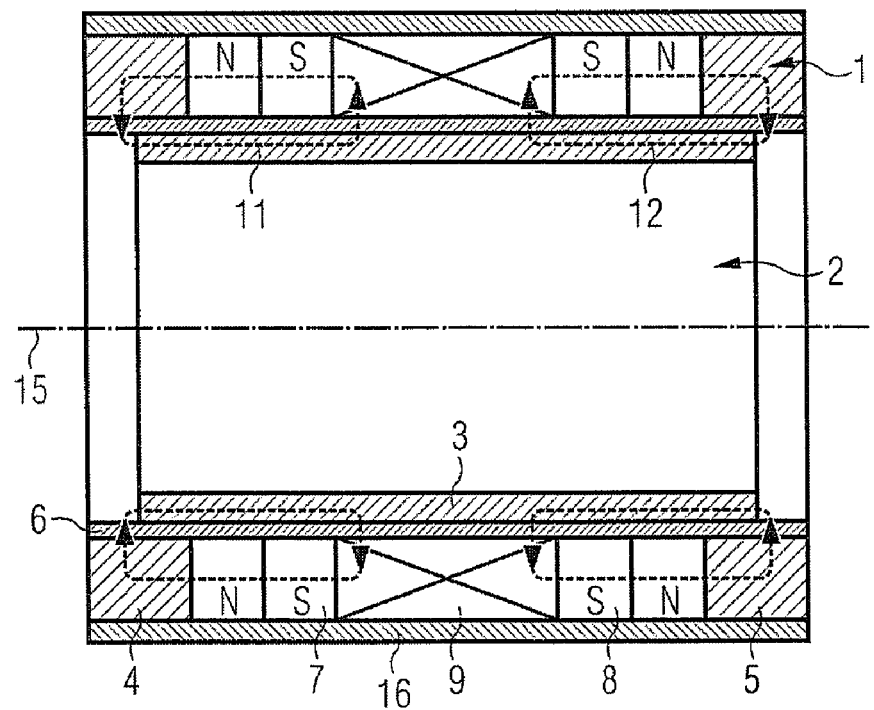
FIG. 6 shows the course of the field in the motor of FIG. 5 with a currentless coil.
Figure 9:
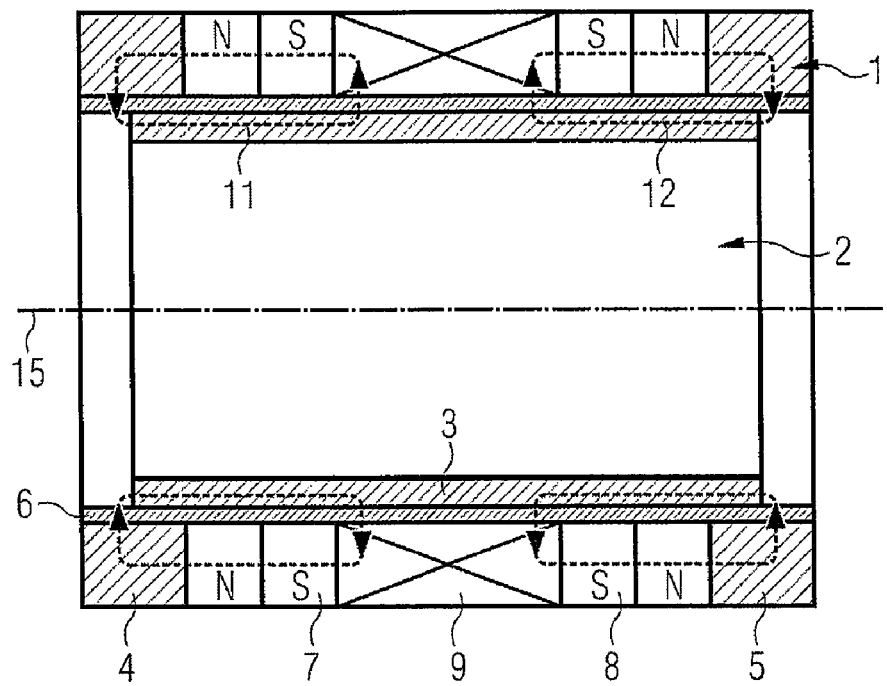
FIG. 9 shows the course of the field in the motor of FIG. 8 with a currentless coil.

The FIGS. 6 and 9 show the course of the field of the motors of FIGS. 5 and 8 with a currentless coil.

Figure 7:
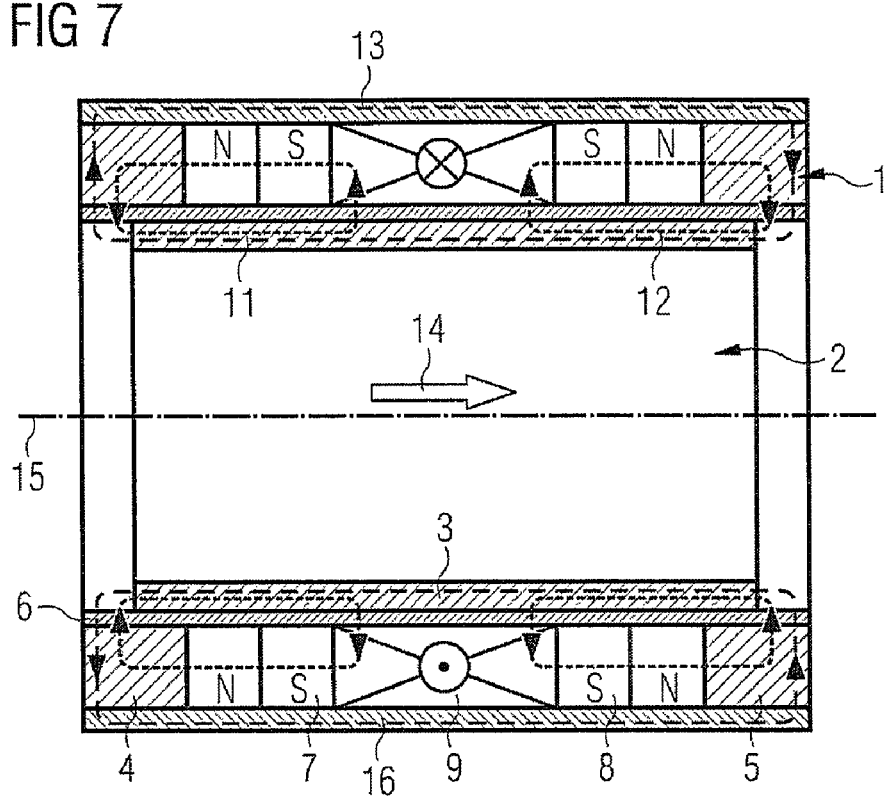
FIG. 7 shows the course of the field in the motor of FIG. 5 with a current-carrying coil.
Figure 10:
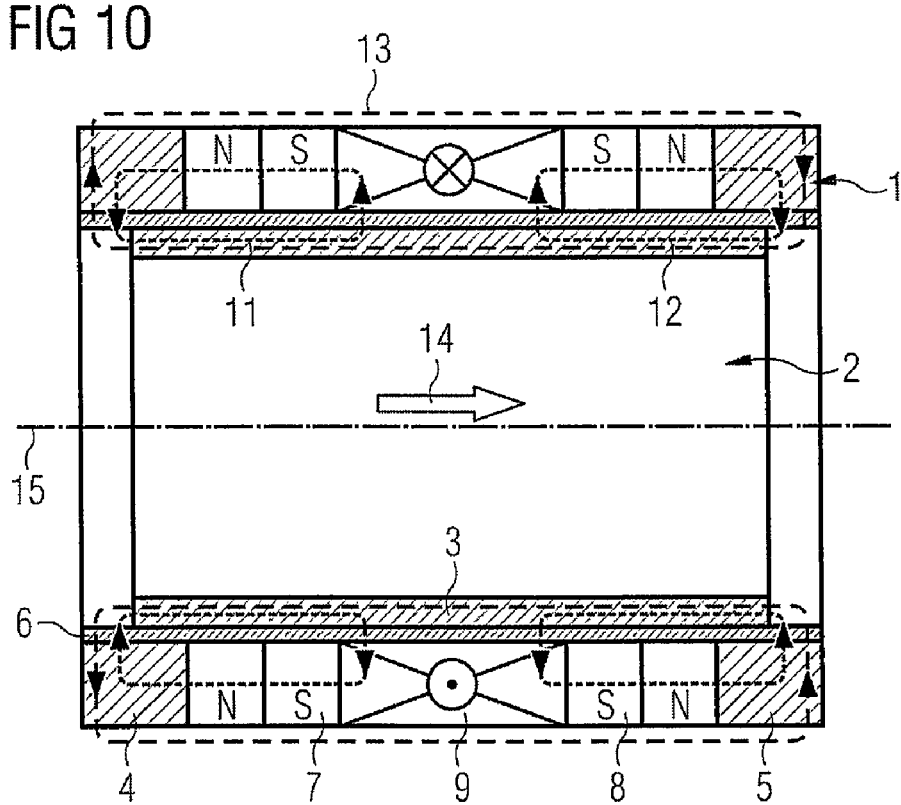
FIG. 10 shows the course of the field in the motor of FIG. 8 with a current-carrying coil.
Figure 11:
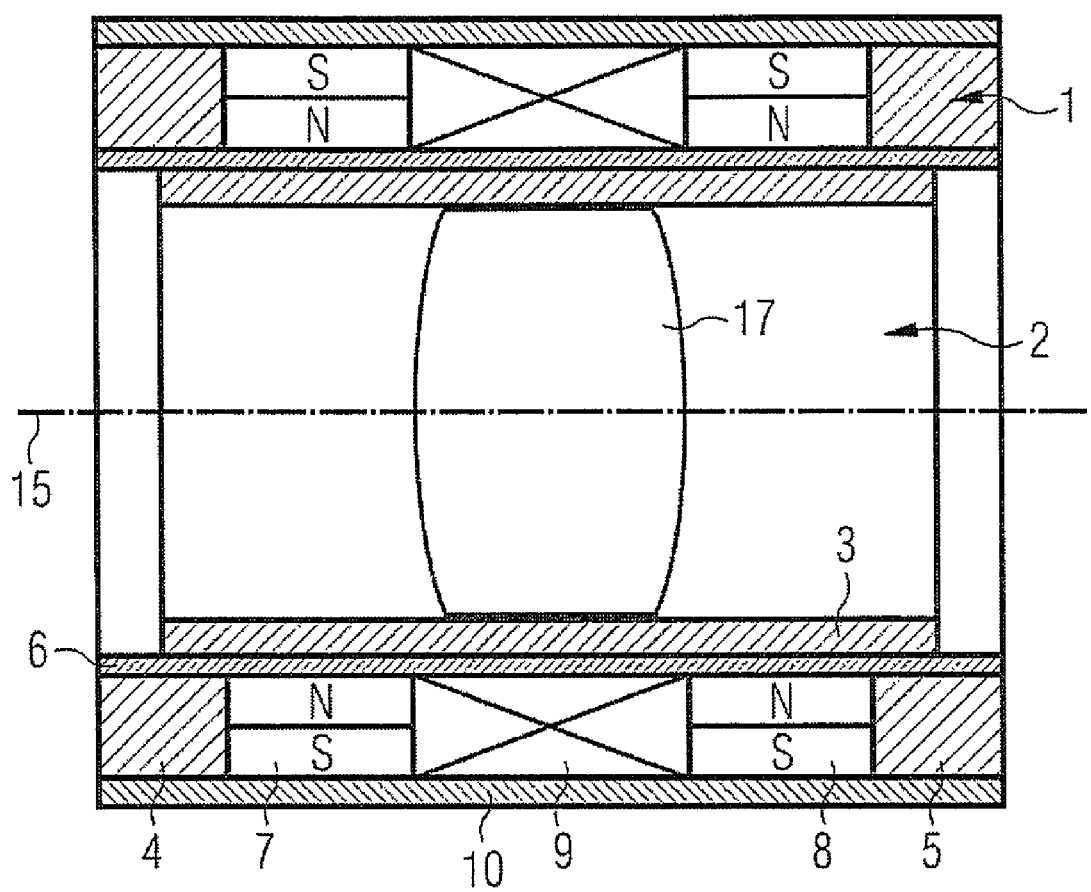
FIG. 11 shows the motors of FIG. 1 with a lens in the yoke.

The FIGS. 7 and 10 show the course of the field of the motors of FIGS. 5 and 8 with a current-carrying coil.

It will be appreciated to those skilled in the art having the benefit of this disclosure that this invention is believed to provide a motor for use in an endoscope tip. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A motor for optical systems comprising:
    a stator with a first permanent magnet and a second permanent magnet, the permanent magnets having poles disposed in a same direction;
    a flux return element magnetically interconnecting the first permanent magnet and the second permanent magnet;
    a coil disposed between the first permanent magnet and the second permanent magnet; and
    a slider which is displaceable parallel to the stator; with the slider having at least one hollow-cylinder shape yoke disposed on a side of the stator facing away from the flux return element, which yoke is in magnetic engagement with the first permanent magnet and the second permanent magnet;
    wherein the pole of a first polarity of the first permanent magnet is oriented between the slider and the opposite pole of the first permanent magnet, and wherein the pole of a first polarity of the second permanent magnet is oriented between the slider and the opposite pole of the second permanent magnet, wherein the pole of the first polarity of the first permanent magnet has the same polarity as the pole of the first polarity of the second permanent magnet.

2. The motor according to claim 1, wherein the stator comprises a first pole shoe and a second pole shoe, each coupled to the flux return element on a respective side of the coil.

3. The motor according to claim 2, wherein the permanent magnets are disposed within an intermediate space between the pole shoes.

4. The motor according to claim 3, wherein a length of the yoke is less than or equal to a distance between the centers of the pole shoes.

5. The motor according to claim 2, wherein the permanent magnets are disposed outside the pole shoes.

6. The motor according to claim 1, wherein the slider is of rotational symmetry.

7. The motor according to claim 1, further comprising a slide sleeve that reduces friction between the stator and the slider.

8. The motor according to claim 1, wherein a lens is disposed in the yoke.

9. The motor according to claim 1, wherein the motor is a linear motor.

* * * * *